United States Patent [19]

Matsuoka et al.

[11] Patent Number: 5,517,480
[45] Date of Patent: May 14, 1996

[54] MAGNETO-OPTICAL INFORMATION REPRODUCING APPARATUS THAT SPLITS A LIGHT BEAM INTO AT LEAST THREE LIGHT BEAMS ADVANCING IN THE SAME DIRECTION

[75] Inventors: Kazuhiko Matsuoka, Yokohama; Osamu Koyama, Kawasaki, both of Japan

[73] Assignee: Canon Kabushiki Kaisha, Tokyo, Japan

[21] Appl. No.: 509,217

[22] Filed: Jul. 31, 1995

Related U.S. Application Data

[63] Continuation of Ser. No. 281,152, Jul. 27, 1994, abandoned, which is a continuation of Ser. No. 27,590, Mar. 5, 1993, abandoned, which is a continuation of Ser. No. 589,628, Sep. 28, 1990, abandoned.

[30] Foreign Application Priority Data

Sep. 29, 1989 [JP] Japan ..................................... 1-255521

[51] Int. Cl.⁶ ..................................................... G11B 7/00
[52] U.S. Cl. ........................ 369/110; 369/44.24; 369/112
[58] Field of Search ............................. 369/44.23, 44.37, 369/110, 111, 112, 118, 44.24, 44.38, 109; 250/201.5, 201.3; 359/437, 583, 283

[56] References Cited

U.S. PATENT DOCUMENTS

| | | | |
|---|---|---|---|
| 4,667,316 | 5/1987 | Suda et al. ............................... | 369/110 |
| 4,674,070 | 6/1987 | Tajima et al. .......................... | 369/44.37 |
| 4,750,162 | 6/1988 | Tajima ..................................... | 369/44.23 |
| 4,771,414 | 9/1988 | Yoshimatsu ............................. | 369/110 |
| 4,787,075 | 11/1988 | Matsuoka et al. ..................... | 369/44.23 |
| 4,853,923 | 8/1989 | Yamada et al. ......................... | 369/110 |
| 4,873,678 | 10/1989 | Nakamura et al. ..................... | 369/110 |
| 4,817,074 | 3/1989 | Yamanaka ................................ | 369/112 |
| 4,907,858 | 3/1990 | Hara et al. .............................. | 350/286 |
| 4,951,274 | 8/1990 | Iwanaga et al. ......................... | 369/110 |
| 4,953,124 | 8/1990 | Koyama ................................... | 365/122 |
| 4,970,710 | 11/1990 | Lee ........................................... | 369/44.23 |
| 4,973,836 | 11/1990 | Matsuoka ................................ | 369/44.23 |
| 4,998,011 | 3/1991 | Shuman ................................... | 369/44.23 |
| 5,004,326 | 4/1991 | Sasaki ...................................... | 369/110 |
| 5,070,493 | 12/1991 | Marshall et al. ........................ | 369/44.23 |
| 5,189,655 | 2/1993 | Ogata et al. ............................. | 369/110 |
| 5,307,335 | 4/1994 | Komiya ................................... | 369/110 |

FOREIGN PATENT DOCUMENTS

| | | | |
|---|---|---|---|
| 0289304 | 11/1988 | European Pat. Off. ............... | 369/110 |
| 57-200958 | 12/1982 | Japan . | |
| 58-128037 | 7/1983 | Japan . | |
| 63-67956 | of 1988 | Japan ................................... | 369/44.23 |
| 64-103406 | of 1989 | Japan ................................... | 369/44.23 |

OTHER PUBLICATIONS

C. A. Gaston, Integrated Autofocusing System and Method of Manufacturing, IBM Technical Disclosure Bulletin vol. 23, No. 5 Oct. 1980 pp. 1906–1908.

*Primary Examiner*—Nabil Z. Hindi
*Attorney, Agent, or Firm*—Fitzpatrick, Cella, Harper & Scinto

[57] ABSTRACT

A magneto-optical information reproducing apparatus includes a device for irradiating a light beam polarized in a predetermined direction onto a recording medium having information magnetically recorded thereon, a device for splitting a reflected or transmitted light beam from the medium, polarization-modulated by a magneto-optical effect in accordance with the information into a first light beam for generating a servo signal and second and third light beams polarized orthogonally for generating a reproduced signal, and a detection device for detecting the three split light beams. The splitting device is arranged such that the three light beams exit in substantially the same direction and the directions of polarization of the second light beam and the third light beam make an angle of 45 degrees with respect to the predetermined direction of polarization of the irradiated light beam.

26 Claims, 8 Drawing Sheets

MAGNETO-OPTICAL INFORMATION REPRODUCING APPARATUS THAT SPLITS A LIGHT BEAM INTO AT LEAST THREE LIGHT BEAMS ADVANCING IN THE SAME DIRECTION

This application is a continuation of prior application, application Ser. No. 08/281,152 filed Jul. 27, 1994, which application is a continuation of prior application, application Ser. No. 08/027,590 filed Mar. 5, 1993, which application is a continuation of prior application, application Ser. No. 07/589,628 filed Sep. 28, 1990, all now abandoned.

BACKGROUND OF THE INVENTION

1. Field of the Invention

The present invention relates to a magneto-optical information reproducing apparatus which reproduces information magnetically recorded on a recording medium by utilizing a magneto-optical effect, and more particularly to an optical element which is to be used in an optical head of the apparatus and which is simple in structure and yet assures a high performance of the apparatus and significantly contributes to reduction of size, weight and cost of the apparatus.

2. Related Background Art

An optical memory which records and reproduces information by a semiconductor laser beam has been recently researched and development vigorously for practical use as a high recording density memory. A read-only optical disk and a DRAW type optical disk which have been commercialized as compact disks as well as an erasable and rewritable magneto-optical disk are considered promising. In the magneto-optical disk, information is magnetically recorded by utilizing a local temperature rise of a magnetic thin film by irradiation of a laser beam spot, and the information is reproduced by a magneto-optical effect (particularly a Kerr effect). The Kerr effect is a phenomenon in which polarization plane is rotated when light is reflected by a magnetic recording medium.

Figure 1:
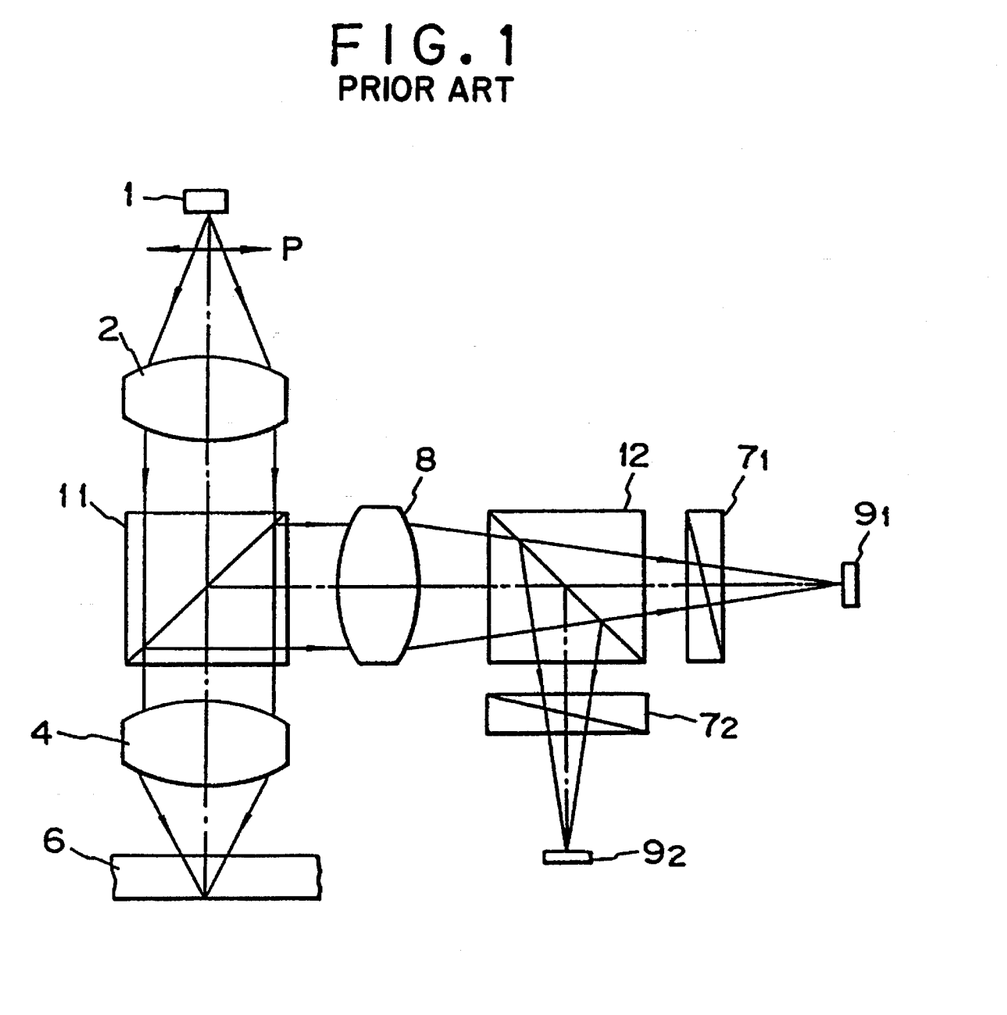
FIG. 1 shows a configuration of a prior art magneto-optical information reproducing apparatus.

A basic configuration of a prior art magneto-optical disk apparatus is shown in FIG. 1. In FIG. 1, numeral 1 denotes a semiconductor laser, numeral 2 denotes a collimator lens, numerals 11 and 12 denote half-mirrors, numeral 4 denotes an objective lens, numeral 6 denotes a magneto-optical recording medium, numerals $7_1$ and $7_2$ denote analyzers, numeral 8 denotes a focusing lens, and numerals $9_1$ and $9_2$ denote photo-detectors. A P-polarized light is parallel to the plane of the drawing and an S-polarized light is normal to the plane of the drawing.

The reproduction of the magneto-optical information in the above apparatus is explained below. A light beam emitted from the semiconductor laser 1 as a linearly polarized P-polarized light is collimated by the collimator lens 2 and passes through the half-mirror 11. In the half-mirror 11, $|t_{OP}|^2 = |t_{OS}|^2 = 0.5$ where $t_{op}$ is an amplitude transmittance of a P-polarization component and $t_{OS}$ is an amplitude transmission of an S-polarization component. The light beam is focused on the magneto-optical recording medium 6 by the objective lens 4 as a fine spot. When a magnetic domain (pit) is preformed on the medium 6, a reflected light from the medium 6 has a polarization plane thereof rotated by $\pm\theta_K$ by the Kerr effect depending on whether the direction of magnetization at the area of the spot irradiation is upward or downward. The following relationship exists between a P-polarization component R and an S-polarization component K of an amplitude reflectance of the recording medium 6.

$$\theta_K = \frac{|K|}{|R|} \quad (1)$$

Figure 2:
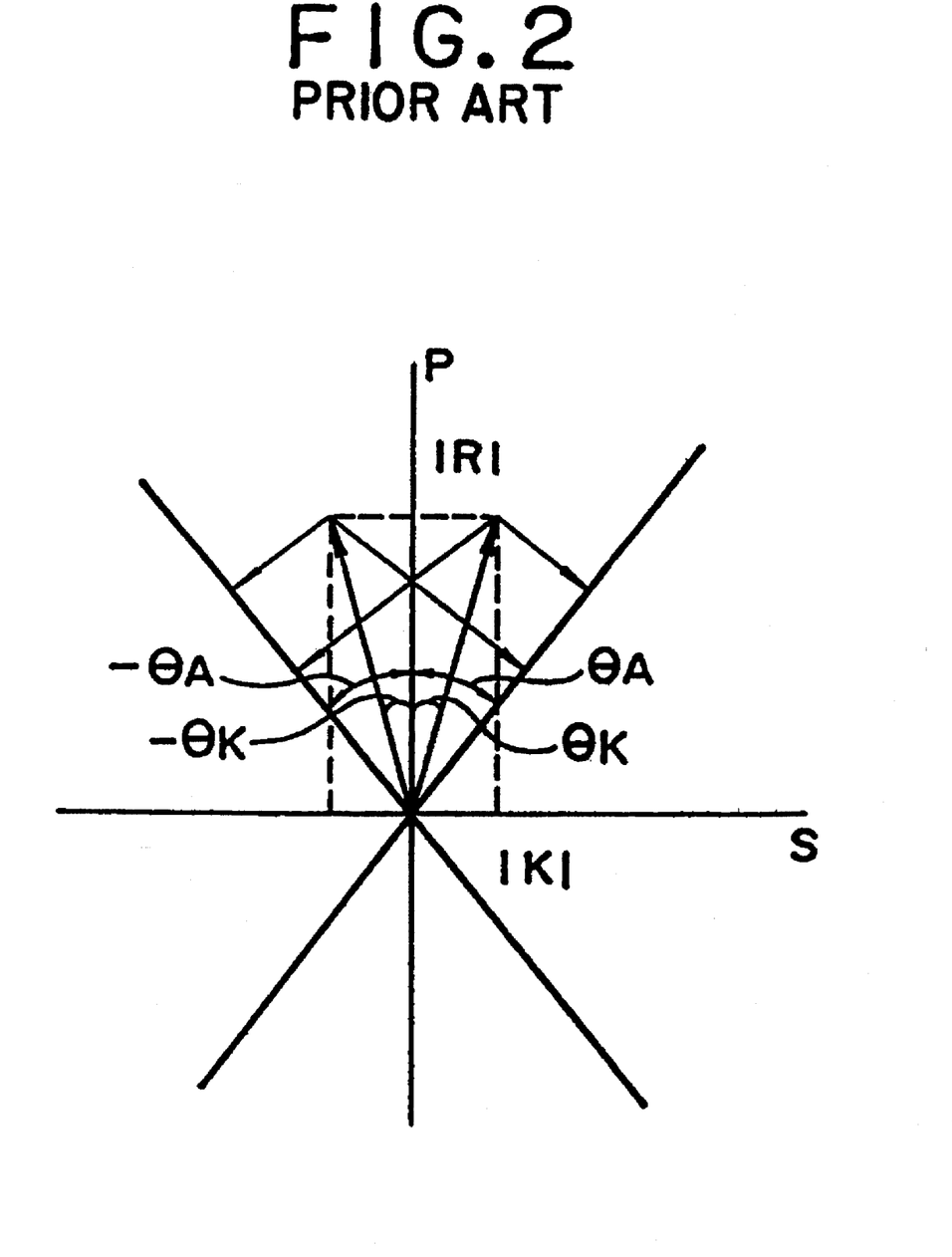
FIG. 2 illustrates a principle of detection of a magneto-optical signal.

The magneto-optically modulated reflected light is again collimated by the objective lens 4, is reflected by the half-mirror 11, converged by the focusing lens 8 and split by the half-mirror 12. The split beams pass through the analyzers $7_1$ and $7_2$ and are detected by the photodetectors $9_1$ and $9_2$ as intensity-modulated light beams. As shown in FIG. 2, an angle between an optical axis of the analyzer and the P-polarization direction is $\pm\theta_A$ on the transmission side and the reflection side, respectively, and the light beam is detected as an orthogonal projection of the amplitude to the optical axis of the analyzer.

The Kerr rotation angle $\theta_K$ is approximately 1 degree and the magneto-optical modulation component is very small. Accordingly, it is necessary to set an azimuth angle $\theta_A$ of the optical axis of the analyzer to an optimum one such that a C/N (carrier to noise ratio) of the detected signal is maximum. For example, in the prior art apparatus, the azimuth angle $\theta_A$ of the optical axis of the analyzer is set to 45 degrees so that the signal light is maximum. When the Kerr rotation angle is $+\Theta_K$, the intensities of the lights which pass through the analyzers in the transmission side and the reflection side and are directed to the photodetectors, respectively, are given by $$\begin{bmatrix} \text{Transmission side: } I_t = \frac{1}{4} I_O(|R|\cos 45° + |K|\sin 45°)^2 \\ \text{Reflection side: } I_r = \frac{1}{4} I_O(|R|\cos 45° - |K|\sin 45°)^2 \end{bmatrix} \quad (2)$$

where $I_O$ is the intensity of incident light to the recording medium. Since $\theta_K$ is approximately one degree, $|R|^2 >> |K|^2$ is met. Accordingly, the formula (2) is expressed as $$\begin{bmatrix} I_t = \frac{1}{8} I_O(|R|^2 + 2|R||K|) \\ I_r = \frac{1}{8} I_O(|R|^2 - 2|R||K|) \end{bmatrix} \quad (3)$$

A second term in the parentheses of the formula (3) represents the magneto-optical modulation component, and a first term represents a non-modulation component. Those lights are photo-electrically converted by the photo-detectors $9_1$ and $9_2$ and they are differentially detected by a differential circuit (not shown) to produce a magneto-optical signal.

However, when noise superimposed on the detected signal is taken into account, it is not always true that a maximum C/N ratio is attained by setting $\theta_A$ to 45 degrees.

On the other hand, in order to improve the C/N ratio of the reproduced signal, Japanese Laid-Open Patent Application No. 57-200958 proposes a magneto-optical information reproducing apparatus which uses a polarization beam splitter in place of the half-mirror 11 of FIG. 1.

Japanese Laid-Open Patent Application No. 58-128037 discloses an apparatus which uses a one-half wavelength plate and a polarization beam splitter (PBS) in place of the half-mirror 12 and the analyzers $7_1$ and $7_2$. This is explained with reference to FIG. 3.

Figure 3:
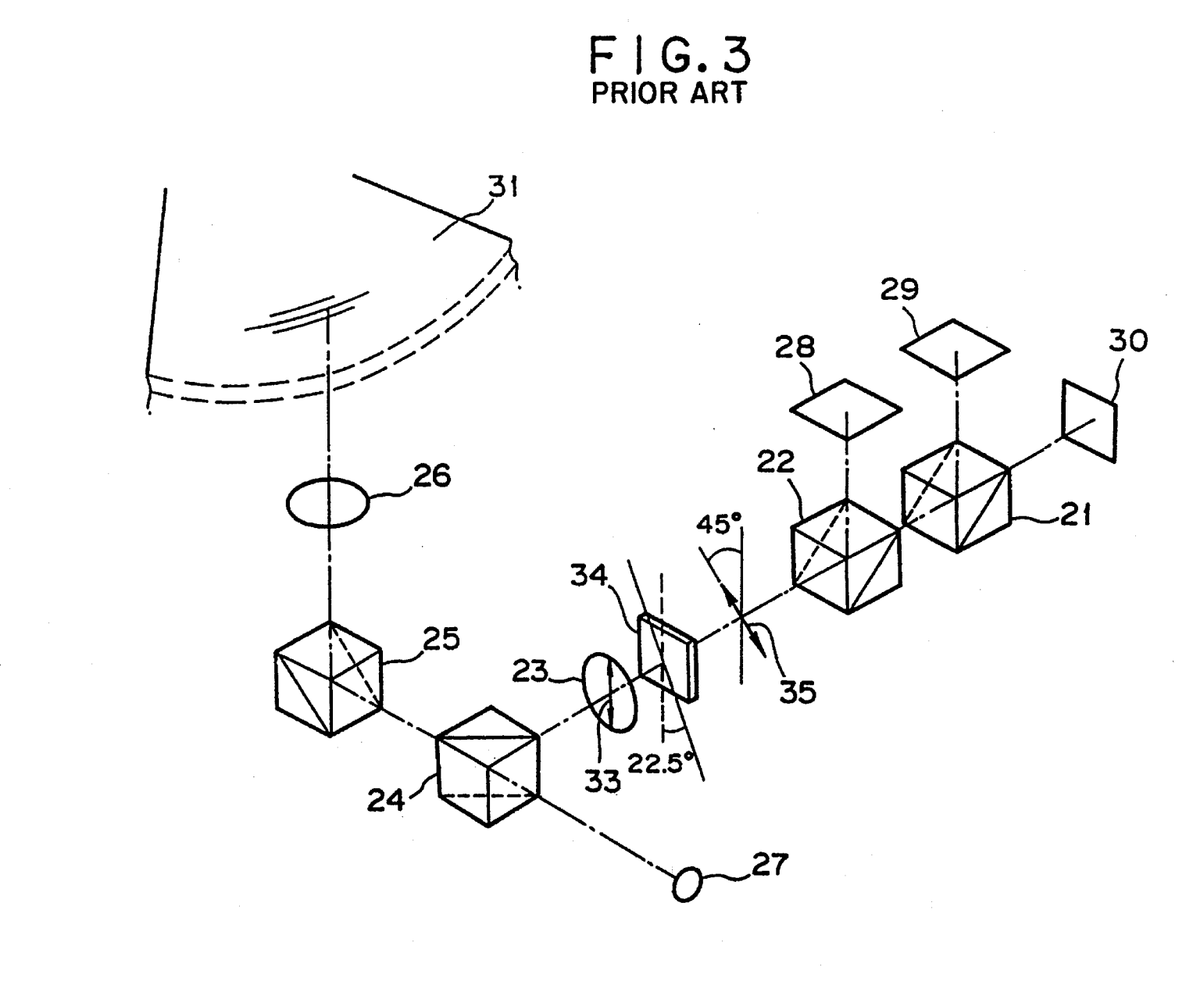
FIG. 3 shows a perspective view of another configuration of a prior art magneto-optical information reproducing apparatus.

In FIG. 3, a light beam emitted from a light source (laser diode) 27 passes through a beam splitter 24, a mirror 25 and an objective lens 26 and is directed to a recording medium 31. The light beam reflected by the medium 31 then passes through the objective lens 26 and the mirror 25 and is directed to the beam splitter 24, and it is reflected toward a focusing lens 23 by the beam splitter 24. Numeral 33 denotes a direction of polarization when the polarized light emitted from the light source 27 travels toward the focusing lens 23 without being subjected to the Kerr effect. Actually, however, when the light is reflected by the medium 31, the polarization plane is rotated by the Kerr rotation angle $\pm\theta_K$ with respect to the direction 33 and is directed to the focusing lens 23. The polarization plane is rotated by 45 degrees by the one-half wavelength plate 34 which has the optical axis thereof inclined by 22.5 degrees with respect to the direction 33 so that it is polarized in the direction 35. A portion of the light beam thus polarized is reflected by the beam splitter 22 and is detected by a servo signal detecting sensor (photo-electric converter) 28. On the other hand, the light beam which has transmitted through the beam splitter 22 is directed to the PBS 21. The light beam directed to the PBS 21 is split into two light beams which are polarized in orthogonal directions, and they are detected by magneto-optical signal sensors (photo-electric converters) 29 and 30, respectively. By differentiating the detection signals of the sensors, the information recorded on the medium is reproduced.

However, in the apparatus shown in FIG. 3, the number of parts required is large and the assembly of those parts is not easy because the azimuth angles of the one-half wavelength plate 34 and the PBS 21 must be strictly adjusted with respect to the direction of polarization of the light beam.

SUMMARY OF THE INVENTION

It is an object of the present invention to provide an optical head for a magneto-optical information reproducing apparatus which assures a stable operation of servo functions of auto-focusing and auto-tracking and improves the C/N ratio of a reproduced signal.

It is another object of the present invention to reduce the number of parts used in the optical head to reduce the size and weight of the optical head and improve the accessing speed of the optical head.

It is still another object of the present invention to provide an optical head which is easy to assemble and adjust so that the cost is reduced in combination with the reduction of the number of parts.

The above objects of the present invention are achieved by a magneto-optical information reproducing apparatus which comprises means for irradiating a light beam polarized in a predetermined direction onto a recording medium having information magnetically recorded thereon, means for splitting a reflected or transmitted light beam from the medium, polarization-modulated by a magneto-optical effect in accordance with the information into a first light beam for generating a servo signal and second and third light beams polarized orthogonally for generating a reproduced signal, and detection means for detecting the three split light beams. The split means is arranged such that the three light beams exit in substantially the same direction and the directions of polarization of the second light beam and the third light beam make an angle of 45 degrees with respect to the predetermined direction of polarization of the irradiated light beam.

DETAILED DESCRIPTION OF THE PREFERRED EMBODIMENTS

Figure 4:
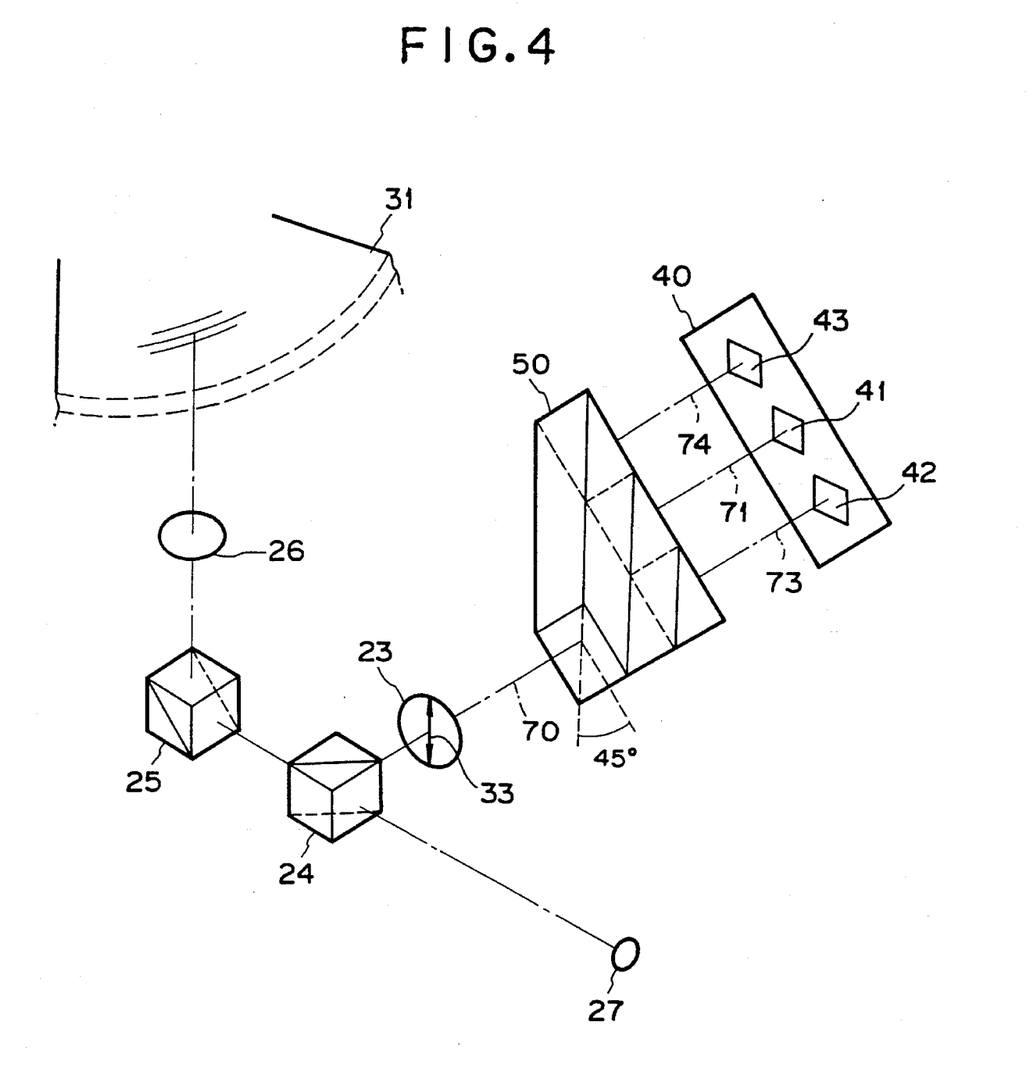
FIG. 4 shows a perspective view of an optical head used in a magneto-optical information reproducing apparatus of the present invention.

FIG. 4 shows a perspective view of an embodiment of an optical head used in a magneto-optical information reproducing apparatus of the present invention. Like elements to those shown in FIG. 3 are designated by like numerals.

In FIG. 4, reference numeral 31 denotes a magnetooptical information recording medium which is of a disk shape and rotated by a spindle motor (not shown). A light beam emitted from a laser diode 27 as a light source and polarized in a predetermined direction shown by arrow 33 passes through a beam splitter 24, is reflected by a deflection mirror 25 and focused onto the medium 31 by an objective lens 26. The beam splitter 24 separates an irradiation light beam to the medium and a reflected light beam from the medium. As shown in Japanese Laid-Open Patent Application No. 57-200958, the beam splitter 24 may have a characteristic of relatively enhancing a polarization component orthogonal to a polarization component in the direction of the arrow 33.

The light beam irradiated to the medium 31 has a polarization status thereof modulated by the magneto-optical effect in accordance with the information recorded on the medium and it is reflected by the medium. The reflected light beam passes through the objective lens 26 and the mirror 25 and is reflected by the beam splitter 24. The reflected light beam is converged by the focusing lens 23 and split into three light beams by a light beam split prism 50, and the three light beams are directed to a detector 40.

Figure 5:
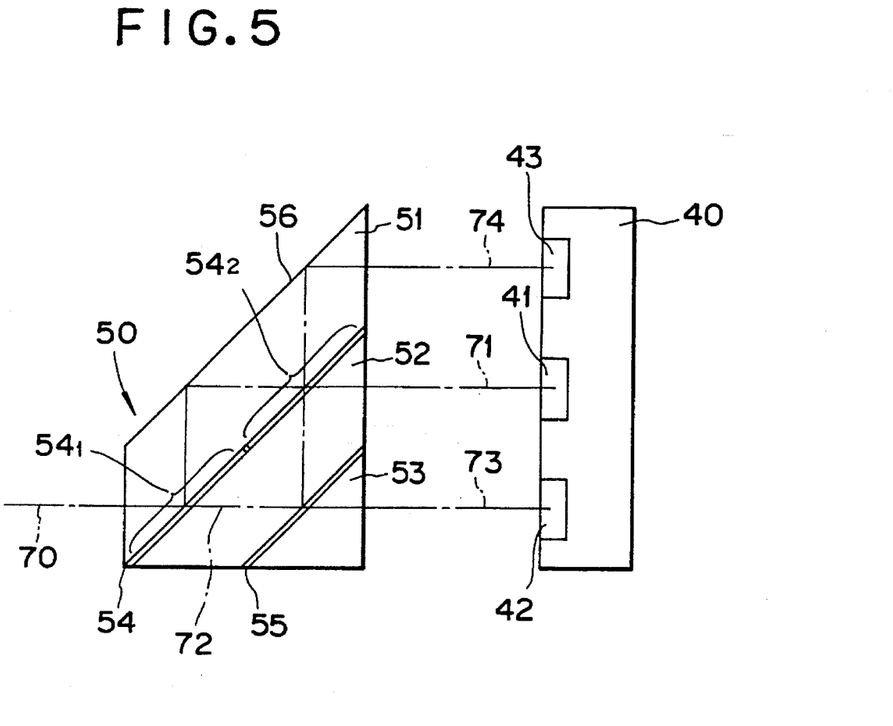
FIGS. 5 and 6 show a sectional view and a partial enlarged view of one embodiment of a light beam split prism used in the present invention.
Figure 6:
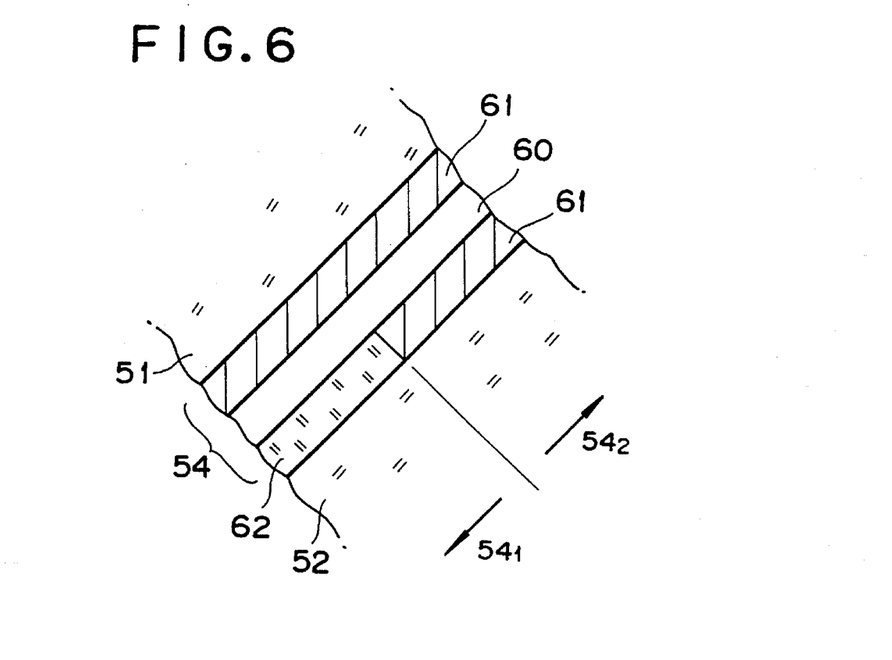

Referring to FIG. 5, a construction and a function of the light beam split prism 50 are explained. The light beam split prism 50 of the present embodiment is constructed by bonding in union a first prism 51 having a parallelogram sectional shape, a second prism 52 having a pedestal sectional shape and a third prism 53 having an isosceles right-angled triangle sectional shape. An enlarged view of a joining plane 54 of the first prism 51 and the second prism 52 is shown in FIG. 6. Anti-reflection films are vapor-deposited on the entire bonding plane of the first prism 51 and a half plane $54_2$ of the bonding plane of the second prism 52, which are to be bonded by bonding material 60. Thus, a fresnel reflection due to a difference between the refractive indexes of the first and second prisms 51 and 52 and the bonding material 60 can be prevented. A beam splitter film is vapor-deposited on the remaining half $54_1$ of the bonding plane of the second prism 52.

Referring again to FIG. 5, a polarization beam splitter film is vapor-deposited on the bonding plane of the second prism 52 on the joining plane 55 of the second prism 52 and the third prism 53. On the other hand, an anti-reflection film is vapor-deposited on the bonding plane of the third prism 53.

A function of the light beam split film 50 is now explained. A light beam 70 focused by a focusing lens (not shown) is applied. The incident light beam 70 is split into a first reflected light beam 71 and a transmitted light beam 72 by the joining plane 54₁ on which the beam splitter film 62 has been vapor deposited. The first light beam 71 is totally reflected by an end plane 56 of the first prism 51 to change the direction of travel, passes through the joining plane 54₂ and is directed to a first photo-sensor 41 of a detector 40. The light beam applied to the first photo-sensor 41 is focused by a focusing lens (not shown), for example. The focusing lens comprises a spherical lens and a cylindrical lens. When auto-focusing by an astigmatism method and auto-tracking by a push-pull method are employed, the photo-sensor 41 is divided into four areas. Thus, it is possible to generate a servo signal for the auto-focusing or the auto-tracking from the first light beam.

In order to generate the servo signal of a high quality, the beam splitter film is preferably a non-polarization beam splitter film whose transmission and reflection characteristics do not depend on the direction of polarization of the incident light. The reason therefor will be explained later.

On the other hand, the transmitted light beam 72 is split into the second light beam 73 and the third light beam 74 which are orthogonally polarized, on the joining plane 55 on which the polarization beam splitter film has been vapor-deposited. The second light beam 73 reaches a second photo-sensor 42 of the detector 40. The third light beam 74 passes through the joining plane 54₂ and is totally reflected by the end plane 56 of the first prism 51 to change the direction of travel, and reaches a third photo-sensor 43 of the detector 40.

In the embodiment of the present invention, the light beam split prism 50 shown in FIG. 5 is arranged at an angle of 45 degrees with respect to the predetermined direction of polarization 33 of the irradiated light beam as shown in FIG. 4. The directions of polarization of the second and third split light beams make the angle of 45 degrees with respect to the predetermined direction of polarization of the irradiated light beam. The light intensities at the photo-sensors 41, 42 and 43 are described below.

Figure 7:
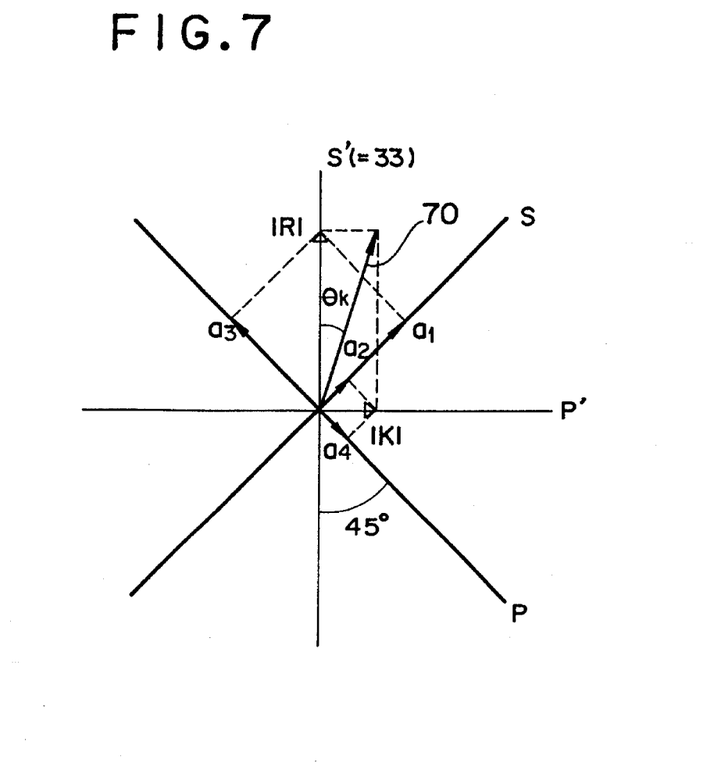
FIG. 7 shows a characteristic of a servo signal generating light beam in the present invention.

FIG. 7 illustrates an operation on the joining plane 54₁. The predetermined direction of polarization 33 of the irradiated light beam is on an S' axis, and the light beam split prism 50 is arranged to make the angle of 45 degrees with respect to the S' axis. Thus, the S-polarization component and the P-polarization component of the incident light beam 70 having the Kerr rotation component of $+\theta_K$, to the joining plane 54₁ are represented by the orthogonal projection components to the S axis and the P axis, respectively. For convenience of explanation, the amplitude transmittances of the beam splitter film 62 to the S-polarization and the P-polarization components are represented by $t_S$ and $t_P$, respectively, and the amplitude reflectances are represented by $r_S$ and $r_P$, respectively. The incident light beam 70 is split to the components $|R|$ and $|K|$ which are the orthogonal projections to the axis S' and the orthogonal P' axis, and the amplitude reflectances $r_S$ and $r_P$ are multiplied to the orthogonal projections $a_1$, $a_2$, $a_3$ and $a_4$ to the S axis and the P axis to determine the intensity $I_{71}$ of the first reflected light beam 71.

$$a_1 = \frac{1}{\sqrt{2}} R \quad (4)$$

$$a_2 = \frac{1}{\sqrt{2}} K \quad (5)$$

$$a_3 = \frac{1}{\sqrt{2}} R \quad (6)$$

$$a_4 = \frac{1}{\sqrt{2}} K \quad (7)$$

where $R = |r|$ and $K = |k|$.

$$I_{71} = (a_1 r_S \pm a_2 r_S)^2 + (a_3 r_P \mp a_4 r_P)^2 \quad (8)$$
$$\approx \frac{1}{2} R^2 (r_P^2 + r_S^2) \pm RK(r_S^2 - r_P^2)$$

where $K \approx 0$.

Depending on the presence or absence of the recorded information, the intensity $I_{71}$ varies between a positive sign and a negative sign in the formula (8). This means that the servo characteristic is unstable if the frequency band of the recorded information is close to the frequency band of the servo signal. This is disadvantageous. If the non-polarization beam splitter film whose reflection and transmission characteristics do not depend on the direction of polarization of the incident light is used, that is, if the film which has the characteristics represented by $$r_p = r_s \quad (9)$$

$$t_p = t_s \quad (10)$$

is used, the second term of the formula (8) disappears and the stable intensity $I_{71}$ which is not affected by the information reproduced signal is produced.

The second light beam 73 and the third light beam 74 split by the joining plane 55 are now explained. The amplitude transmittances of the polarization beam splitter film to the S-polarization and the P-polarization components are represented by $t_s'$ and $t_p'$, respectively, and the amplitude reflectances are represented by $r_s'$ and $r_p'$, respectively. Since the non-polarization beam splitter film is used for the joining plane 54₁ the following conditions are met because of the polarization beam splitter film.

$$(t_P')^2 = (r_S')^2 = 1 \quad (11)$$

$$(t_S')^2 = (r_P')^2 \approx 0 \quad (12)$$

The intensity $I_{73}$ of the second split light beam 73 and the intensity $I_{74}$ of the third split light beam 74 are represented by $$I_{73} = \left(\frac{1}{\sqrt{2}} R t_P t_P' \mp \frac{1}{\sqrt{2}} K t_P t_P'\right)^2 + \left(\frac{1}{\sqrt{2}} R t_S t_S' \pm \frac{1}{\sqrt{2}} K t_S t_S'\right)^2 \quad (13)$$
$$\approx \frac{1}{2} R^2 t_P^2 \mp R K t_P^2$$

$$I_{74} = \left(\frac{1}{\sqrt{2}} R t_S r_S' \pm \frac{1}{\sqrt{2}} K t_S r_S'\right)^2 + \left(\frac{1}{\sqrt{2}} R t_P r_P' \mp \frac{1}{\sqrt{2}} K t_P r_P'\right)^2 \quad (14)$$
$$\approx \frac{1}{2} R^2 t_S^2 \pm R K t_S^2$$

Accordingly, by differentiating the outputs of the photo-sensors 42 and 43, the reproduced information signal RF represented by $$RF = \mp RK\,(t_p^2 + t_s^2) \tag{15}$$

is produced. In this manner, the information is reproduced from the second and third split light beams.

In accordance with the present embodiment, the magneto-optical information reproducing apparatus comprises means for irradiating the light beam polarized in the predetermined direction onto the recording medium having information magnetically recorded thereon, means for splitting the reflected or transmitted light beam from the medium having the polarization status modulated by the magneto-optical effect in accordance with the information, into the first light beam for generating the servo signal and the second and third light beams orthogonally polarized for generating the reproduced signal of the information, and detection means for detecting the three split light beams. The split means has the beam splitter film for splitting the first light beam, and the polarization beam splitter film for splitting the light beam other than the first split light beam into the second light beam and the third light beam in the sequence of the travel of the reflected or transmitted light beam from the medium, and the split means is arranged such that the three light beams exit in substantially the same direction and the directions of polarization of the second light beams and the third light beams make the angle of 45 degrees with respect to the predetermined direction of polarization of the irradiated light beam.

The first embodiment of the present invention has been described with reference to FIGS. 4 to 7. To compare the present embodiment with the prior art shown in FIG. 1, the light beam split prism 50 which is constructed by the three prisms 51, 52 and 53 joined in union is arranged to make the angle of 45 degrees with respect to the direction of polarization 33 of the irradiated light beam so that the directions of polarization of the second and third split light beams make the angle of 45 degrees with respect to the predetermined direction of polarization of the irradiated light beam. As a result;

(1) The one-half wavelength plate is not necessary.

(2) The adjustment of the azimuth angles of the one-half wavelength plate and the polarization beam splitter is not necessary.

(3) The number of elements of the prism downstream of the focusing lens is reduced from four to three. In other words, the function of the two prisms 21 and 22 can be done by one prism 50.

(4) The number of detectors is reduced from three to one.

(5) The assembling and adjusting works are reduced.

(6) In the prior art apparatus, when the reproduced information signal is to be produced by the differential detection method, a difference between the noises separately generated by the detectors 29 and 30, a difference between the aging variations of the photo-electric conversion characteristics and a difference between the variations of the characteristics by a temperature change cause the reduction of the C/N ratio. In the present embodiment, since the three split light beams 71, 73 and 74 exit in the same direction, the detector 40 which includes the photo-sensors 41, 42 and 43 formed on one semiconductor substrate and having the same characteristic may be used. Accordingly, the noises are cancelled out by the differential operation and the above problem is significantly solved.

In the present embodiment, the three split light beams 71, 73 and 74 exit in the same direction, although there may be some variations among the directions of the three light beams as long as they are in substantially the same direction.

Figure 8:
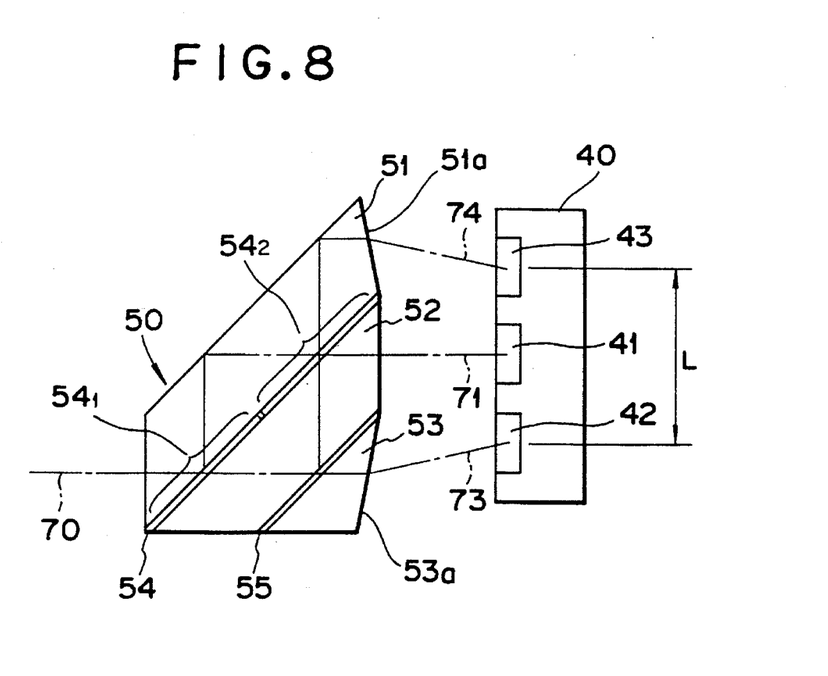
FIGS. 8, 9, 10 and 11 show sectional views of other embodiments of the light beam split prisms of the present invention.

FIG. 8 shows another embodiment of the light beam split prism 50 to be used in the optical head of the magneto-optical information reproducing apparatus of the present invention. By shaping the first prism 51 and the third prism 53 such that an exit end plane 51a of the first prism 51 and an exit end plane 53a of the third prism 53 obliquely intersect the light beams 74 and 73, respectively, a spacing L between the photo-sensors 42 and 43 can be reduced. Thus, the detector 40 is reduced in size, which contributes to reduce the size of the optical head.

Figure 9:
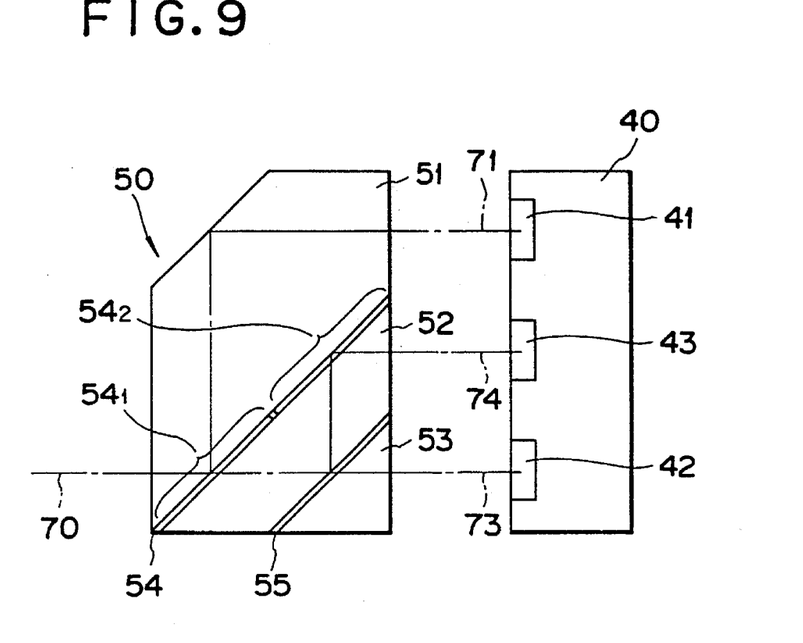

FIG. 9 shows another embodiment of the light beam split prism 50. In the present embodiment, a reflection film is vapor-deposited so that it functions as a reflection plane to the joining plane $54_2$. In accordance with a feature of the present embodiment, the spacing between the photo-sensors 42 and 43 for reproducing the information can be further reduced compared to the previous embodiment. Thus, the difference between the electrical characteristics of the photo-sensors 42 and 43 is further reduced and the reduction of the C/N of the reproduced information signal is prevented.

Figure 10:
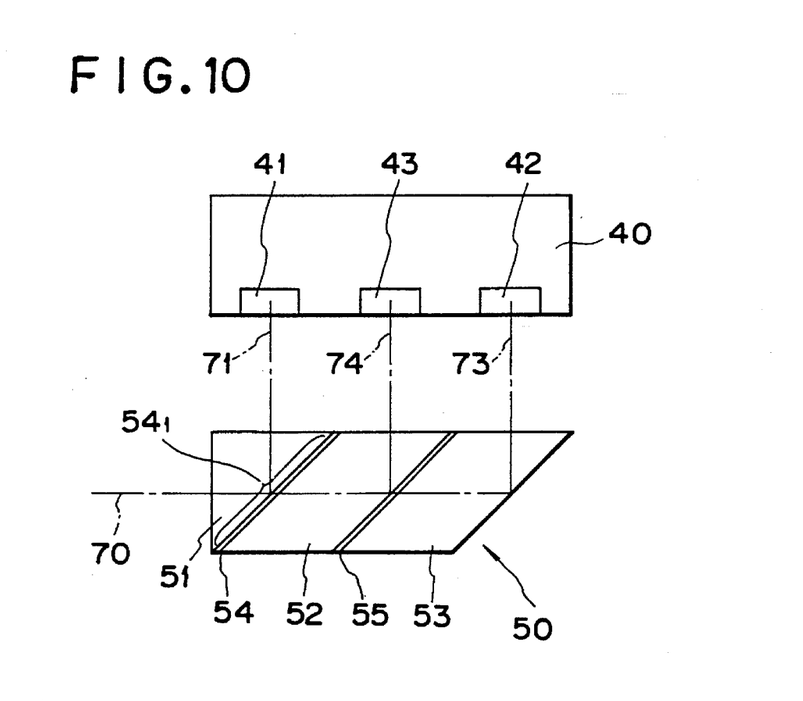
Figure 11:
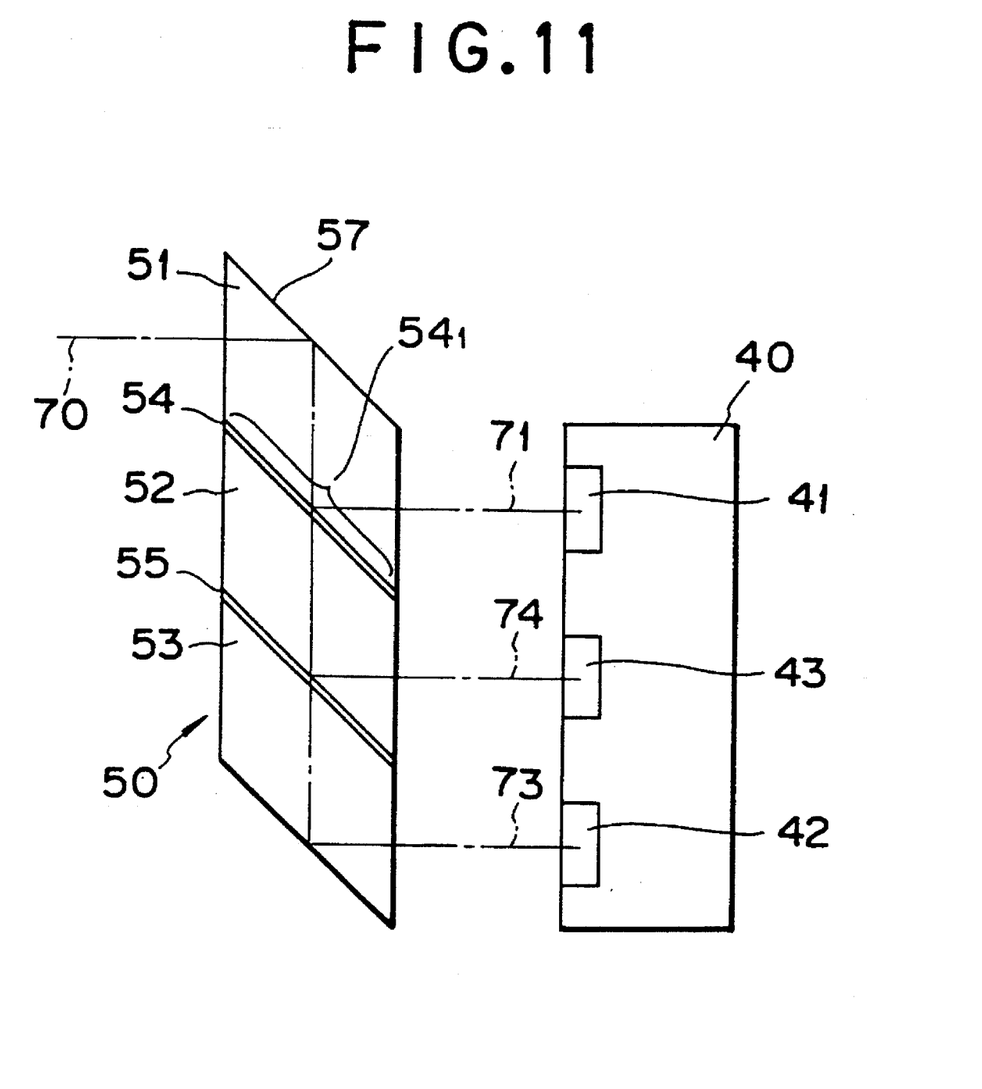

FIGS. 10 and 11 show other embodiments of the light beam split prism 50. In FIG. 10, the second prism 52 and the third prism 53 are of the same shape. In FIG. 11, all prisms are of the same shape. In both embodiments, the cost of the prisms 51, 52 and 53 which are components of the light beam split prism 50 can be reduced by mass production.

In the embodiments described above, the focusing lens may be bonded on the incident end plane of the first prism 51. In the embodiments other than the embodiment of FIG. 8, the detector 40 may be bonded to the exit end plane of the light beam split prism to achieve the same object.

In accordance with the present invention, the light beam split prism shown in each of the embodiments is used with the magneto-optical information recording apparatus to assure stable operation of the servo function and produce a reproduced information signal having a high C/N ratio. Further, the number of parts is reduced so that the size and weight of the optical head used in the magneto-optical information recording apparatus are reduced. In addition, the assembling and adjusting work is facilitated and the cost is reduced.

What is claimed is:

1. A magneto-optical information reproducing apparatus, comprising:

irradiation means for irradiating a light beam polarized in a predetermined direction onto a recording medium having information magnetically recorded thereon;

separation means for separating, from the light beam irradiating the recording medium, a light beam from the recording medium;

prism means for splitting the light beam separated by said separation means into at least first, second and third light beams, and for emitting the first, second and third light beams in substantially the same direction, said prism means comprising (i) a non-polarization beam splitter film for splitting the separated light beam into the first light beam, (ii) a polarization beam splitter film for splitting the separated light beam into the second and third light beams, at an angle of 45 degrees with respect to the predetermined direction of polarization of the irradiating light beam and (iii) a film for one of reflecting and transmitting the third light beam being provided on a prism surface on which the non-polarization beam splitter film is provided;

first detection means for detecting the first light beam split by said prism means to produce one of a focus control signal and a tracking control signal for controlling the light beam irradiating the recording medium; and second detection means for detecting the second and third light beams split by said prism means to produce a signal for reproducing the information recorded on the recording medium.

2. An apparatus according to claim 1, wherein said prism means comprises three prisms constructed as a unit.

3. A magneto-optical information reproducing apparatus, comprising:

irradiation means for irradiating a light beam polarized in a predetermined direction onto a recording medium having information magnetically recorded thereon;

separation means for separating, from the light beam irradiating the recording medium, a light beam from the recording medium;

splitting means for splitting the light beam separated by said separation means into at least first, second and third light beams, said splitting means comprising (i) a splitting surface having a normal in the same plane as the light beams, (ii) means for emitting the first, second and third light beams in substantially the same direction by said splitting surface, (iii) a non-polarization beam splitter film for splitting the separated light beam into the first light beam, (iv) a polarization beam splitter film for splitting the separated light beam into the second and third light beams, at an angle of 45 degrees with respect to the predetermined direction of polarization of the irradiating light beam and (v) a film for one of reflecting and transmitting the third light beam being provided on a prism surface of said splitting means on which the non-polarization beam splitter film is provided;

first detection means for detecting the first light beam split by said splitting means to produce one of a focus control signal and a tracking control signal for controlling the light beam irradiating the recording medium; and second detection means for detecting the second and third light beams split by said prism means to produce a signal for reproducing the information recorded on the recording medium.

4. An apparatus according to claim 3, wherein said splitting means comprises three prisms constructed as a unit.

5. A magneto-optical information reproducing apparatus comprising:

irradiating means for irradiating a light beam polarized in a predetermined direction onto a recording medium having information magnetically recorded thereon;

splitting means for splitting the light beam from the recording medium into at least first, second and third light beams, and for emitting the first, second and third light beams in substantially the same direction, said splitting means comprising splitting surfaces having a normal in the same plane as the light beams, the splitting surface for splitting the light beam from the recording medium into the first light beam including a non-polarization beam splitter film, the splitting surface for splitting the light beam from the recording medium into the second and third light beams including a polarization beam splitter film, which splits the second and third light beams at an angle of 45 degrees with respect to the predetermined direction of polarization of the irradiating light beam and a splitting surface for one of reflecting and transmitting the third light beam being provided on the splitting surface on which the non-polarization beam splitter is provided;

first detection means for detecting the first light beam split by said splitting means to obtain one of a focus control signal and a tracking control signal of the light beam guided onto the recording medium; and second detection means for detecting the second and third light beams split by said splitting means to obtain a reproducing signal of the information recorded onto the recording medium.

6. An apparatus according to claim 5, wherein said splitting means comprises three prisms constructed as a unit.

7. An apparatus according to claim 5, wherein said splitting means emits the first, second and third light beams in substantially the same direction.

8. An apparatus according to claim 1, wherein the film for one of reflecting and transmitting the third light beam is an anti-reflection film.

9. An apparatus according to claim 1, wherein the film for one of reflecting and transmitting the third light beam is a reflection film.

10. An apparatus according to claim 3, wherein the film for one of reflecting and transmitting the third light beam is an anti-reflection film.

11. An apparatus according to claim 3, wherein the film for one of reflecting and transmitting the third light beam is a reflection film.

12. An apparatus according to claim 5, wherein the film for one of reflecting and transmitting the third light beam is an anti-reflection film.

13. An apparatus according to claim 5, wherein the film for one of reflecting and transmitting the third light beam is a reflection film.

14. A magneto-optical information reproducing apparatus, comprising:

irradiation means for irradiating a light beam polarized in a predetermined direction onto a recording medium having information magnetically recorded thereon;

separation means for separating, from the light beam irradiating the recording medium, a light beam from the recording medium;

prism means for splitting the light beam separated by said separation means into at least first, second and third light beams, and for emitting the first, second and third light beams in substantially the same direction, said prism means comprising (i) a first beam splitter film for splitting the separated light beam into the first light beam, (ii) a second beam splitter film for splitting the separated light beam into the second and third light beams, at an angle of 45 degrees with respect to the predetermined direction of polarization of the irradiating light beam and (iii) a film for one of reflecting and transmitting the third light beam being provided on a prism surface on which said first beam splitter film is provided;

first detection means for detecting the first light beam split by said prism means to produce one of a focus control signal and a tracking control signal for controlling the light beam irradiating the recording medium; and second detection means for detecting the second and third light beams split by said prism means to produce a signal for reproducing the information recorded on the recording medium.

15. An apparatus according to claim 14, wherein the film for one of reflecting and transmitting the third light beam is an anti-reflection film.

16. An apparatus according to claim 14, wherein the film for one of reflecting and transmitting the third light beam is a reflection film.

17. A apparatus according to claim 14, wherein said prism means comprises three prisms constructed as a unit.

18. A magneto-optical information reproducing apparatus, comprising:

irradiation means for irradiating a light beam polarized in a predetermined direction onto a recording medium having information magnetically recorded thereon;

separation means for separating, from the light beam irradiating the recording medium, a light beam from the recording medium;

splitting means for splitting the light beam separated by said separation means into at least first, second and third light beams, said splitting means comprising (i) a splitting surface having a normal in the same plane as the light beams, (ii) means for emitting the first, second and third light beam, in substantially the same direction by said splitting surface, (iii) a first beam splitter film for splitting the separated light beam into the first light beam, (iv) a second beam splitter film for splitting the separated light beam into the second and third light beams, at an angle of 45 degrees with respect to the predetermined direction of polarization of the irradiating light beam and (v) a film for one of reflecting and transmitting the third light beam being provided on a prism surface of said splitting means on which said first beam splitter film is provided;

first detection means for detecting the first light beam split by said splitting means to produce one of a focus control signal and a tracking control signal for controlling the light beam irradiating the recording medium; and second detection means for detecting the second and third light beams split by said prism means to produce a signal for reproducing the information recorded on the recording medium.

19. An apparatus according to claim 18, wherein the film for one of reflecting and transmitting the third light beam is an anti-reflection film.

20. An apparatus according to claim 18, wherein the film for one of reflecting and transmitting the third light beam is a reflection film.

21. An apparatus according to claim 18, wherein said splitting means comprises three prisms constructed as a unit.

22. A magneto-optical information reproducing apparatus comprising:

irradiating means for irradiating a light beam polarized in a predetermined direction onto a recording medium having information magnetically recorded thereon;

splitting means for splitting the light beam from the recording medium into at least first, second and third light beams, and for emitting the first, second and third light beams in substantially the same direction, said splitting means comprising splitting surfaces having a normal in the same plane as the light beams, the splitting surface for splitting the light beam from the recording medium into the first light beam including a first beam splitter film, the splitting surface for splitting the light beam from the recurring medium into the second and third light beams including a second beam splitter film, which splits the second and third light beams at an angle of 45 degrees with respect to the predetermined direction of polarization of the irradiating light beam and a splitting surface for one of reflecting and transmitting the third light beam being provided on the splitting surface on which said first beam splitter is provided;

first detection means for detecting the first light beam split by said splitting means to obtain one or a focus control signal and a tracking control signal of the light beam guided onto the recording medium; and second detection means for detecting the second and third light beams split by said splitting means to obtain a reproducing signal of the information recorded onto the recording medium.

23. An apparatus according to claim 22, wherein the film for one of the reflecting and transmitting the third light beam is an anti-reflection film.

24. An apparatus according to claim 22, wherein the film for one of the reflecting and transmitting the third light beam is a reflection film.

25. An apparatus according to claim 22, wherein said splitting means comprises three prisms constructed as a unit.

26. An apparatus according to claim 22, wherein said splitting means emits the first, second and third light beams in substantially the same direction.

* * * * *

UNITED STATES PATENT AND TRADEMARK OFFICE
CERTIFICATE OF CORRECTION

PATENT NO. : 5,517,480          Page 1 of 2
DATED : May 14, 1996
INVENTOR(S) : KAZUHIKO MATSUOKA, ET AL.

It is certified that error appears in the above-indentified patent and that said Letters Patent is hereby corrected as shown below:

COLUMN 1:

Line 37, "which" should read --which a--.

COLUMN 2:

Line 23, "+$\Theta_K$," should read --+$\theta_K$,--.

COLUMN 3:

Line 19, "the-medium" should read --the medium--.

COLUMN 4:

Line 23, "magnetooptical" should read --magneto-optical--.
    Line 57, "fresnel" should read --Fresnel--.

COLUMN 6:

Line 14, "$K\approx 0$." should read --$K^2 \approx 0$.--.

COLUMN 10:

Line 66, "A" should read --An--.

UNITED STATES PATENT AND TRADEMARK OFFICE
CERTIFICATE OF CORRECTION

PATENT NO. : 5,517,480
DATED : May 14, 1996
INVENTOR(S) : KAZUHIKO MATSUOKA, ET AL.

It is certified that error appears in the above-indentified patent and that said Letters Patent is hereby corrected as shown below:

COLUMN 11:

Line 14, "beam," should read --beams--.

COLUMN 12:

Line 24, "or" should read --of--.
  Line 33, "of the" should read --of--.

Signed and Sealed this

Twenty-ninth Day of October 1996

Attest:

BRUCE LEHMAN

*Attesting Officer*   *Commissioner of Patents and Trademarks*